(12) United States Patent
Huang et al.

(10) Patent No.: US 12,419,276 B2
(45) Date of Patent: Sep. 23, 2025

(54) APPARATUS AND METHOD FOR CONTROLLING ANTI-BARKING DEVICE WITH NOISE REDUCTION

(71) Applicant: Quanzhou Purplebox Electronics Co., Ltd., Fujian (CN)

(72) Inventors: Zhican Huang, Fujian (CN); Baoyin Huang, Fujian (CN); Xiaowei Zhang, Fujian (CN)

(73) Assignee: Quanzhou Purplebox Electronics Co., Ltd., Quanzhou (CN)

( * ) Notice: Subject to any disclaimer, the term of this patent is extended or adjusted under 35 U.S.C. 154(b) by 232 days.

(21) Appl. No.: 18/492,166

(22) Filed: Oct. 23, 2023

(65) Prior Publication Data

US 2024/0147963 A1    May 9, 2024

Related U.S. Application Data

(63) Continuation of application No. PCT/CN2022/131871, filed on Nov. 15, 2022.

(30) Foreign Application Priority Data

Nov. 3, 2022  (CN) .......................... 202211367876.0

(51) Int. Cl.
*A01K 15/02* (2006.01)
*A01K 27/00* (2006.01)
*G10K 11/178* (2006.01)

(52) U.S. Cl.
CPC .......... *A01K 15/022* (2013.01); *A01K 27/001* (2013.01); *A01K 27/009* (2013.01);
(Continued)

(58) Field of Classification Search
CPC .. A01K 15/021; A01K 15/022; A01K 27/009; A01K 27/001; A01K 29/005;
(Continued)

(56) References Cited

U.S. PATENT DOCUMENTS

| | | | | |
|---|---|---|---|---|
| 4,947,795 A | * | 8/1990 | Farkas | ................. A01K 27/009 119/718 |
| 10,080,349 B2 | * | 9/2018 | Ikeda | ....................... A61D 1/08 |

(Continued)

FOREIGN PATENT DOCUMENTS

| | | |
|---|---|---|
| CN | 106790882 A | 5/2017 |
| CN | 109601418 A | 4/2019 |

(Continued)

OTHER PUBLICATIONS

International Search Report cited in PCT/CN2022/131871 mailed Jun. 28, 2023, 3 pages.

(Continued)

*Primary Examiner* — Forrest M Phillips
*Assistant Examiner* — Joseph James Peter Illicete
(74) *Attorney, Agent, or Firm* — Cooper Legal Group, LLC (57) ABSTRACT

The present disclosure relates to the technical field of anti-barking devices, and provides an apparatus and method for controlling an anti-barking device with noise reduction. The apparatus includes a fixing device wearable on a neck of a pet dog, a housing, an anti-barking device, a main microphone sound collection module, an auxiliary microphone sound collection module, a differential amplifier module, a microprocessor, a sound-based detection start module and a motion sensor. The present disclosure solves the problem of high false triggering rate in existing anti-barking devices.

7 Claims, 8 Drawing Sheets

(52) U.S. Cl.
CPC .. *G10K 11/17823* (2018.01); *G10K 11/17873* (2018.01); *G10K 2210/3027* (2013.01); *G10K 2210/3028* (2013.01); *G10K 2210/3044* (2013.01); *G10K 2210/3045* (2013.01)

(58) Field of Classification Search
CPC ....... G10K 11/17823; G10K 11/17873; G10K 2210/3027; G10K 2210/3028; G10K 2210/3044; G10K 2210/3045
USPC .............................................. 607/30, 32, 60
See application file for complete search history.

(56) References Cited

U.S. PATENT DOCUMENTS

| | | | | |
|---|---|---|---|---|
| 10,939,666 | B2* | 3/2021 | Van Curen | A01K 29/005 |
| 11,445,707 | B2* | 9/2022 | Tarbutton | A01K 15/021 |
| 2005/0145200 | A1* | 7/2005 | Napolez | A01K 15/022 |
| | | | | 119/718 |
| 2010/0050954 | A1* | 3/2010 | Lee, IV | A01K 15/022 |
| | | | | 119/718 |
| 2013/0180467 | A1* | 7/2013 | Wong | A01K 15/022 |
| | | | | 119/718 |
| 2013/0233252 | A1* | 9/2013 | Bellon | A01K 15/029 |
| | | | | 119/720 |
| 2020/0015456 | A1* | 1/2020 | Van Curen | A01K 15/022 |

FOREIGN PATENT DOCUMENTS

| | | |
|---|---|---|
| CN | 110754391 A | 2/2020 |
| CN | 110864710 A | 3/2020 |
| CN | 110915713 A | 3/2020 |
| CN | 213719354 U | 11/2020 |
| KR | 20150080999 A | 7/2015 |

OTHER PUBLICATIONS

Written Opinion cited in PCT/CN2022/131871 mailed Jun. 28, 2023, 3 pages.

* cited by examiner

APPARATUS AND METHOD FOR CONTROLLING ANTI-BARKING DEVICE WITH NOISE REDUCTION

CROSS-REFERENCE TO RELATED APPLICATIONS

This application is a continuation of International Patent Application PCT/CN2022/131871, filed Nov. 15, 2022, which claims priority to Chinese Patent Application 202211367876.0, filed Nov. 3, 2022. International Patent Application PCT/CN2022/131871 and Chinese Patent Application 202211367876.0 are incorporated herein by reference.

TECHNICAL FIELD

The present disclosure relates to the technical field of anti-barking devices, and in particular to an apparatus and method for controlling an anti-barking device with noise reduction.

BACKGROUND

With the improvement of people's living standards, people pay more attention to the quality of life of pets, and more and more people regard pets as a member of the family. However, pet dogs cannot control their nature sometimes. Their barking often interferes with people's normal life, and also puts their owners in a potential crisis of being complained by neighbors. In order to prevent dogs from barking frequently, an anti-barking device is designed to train pet dogs. When a pet dog barks, the device will stimulate the pet dog to stop barking by means of static pulses, vibrations or warning sound. At present, the traditional anti-barking device for a pet on the market determines whether a pet is barking by a combination of volume and sound frequency. This type of solution has a low success rate of sound detection, a high probability of false triggering and a high manufacturing cost. To this end, anti-barking devices that use other methods for sound detection have emerged. For example, a Chinese patent CN202022782468.4 discloses a novel anti-barking device for a pet, including a microphone, an audio amplifier, a filter, an analog-digital converter, a memory, a comparator and a vibrating reminder. The microphone, the audio amplifier, the filter, the analog-digital converter, the memory, the comparator and the vibrating reminder are electrically connected. The microphone converts a mechanical vibration signal of pet's sound into an electrical signal which is then amplified by the audio amplifier and filtered by the filter. This anti-barking device has a low manufacturing cost, but it still cannot effectively and accurately distinguish whether the pet itself is barking or a dog nearby is barking, which may cause false triggering of the anti-barking device. As another example, CN 110915713 A discloses a method and apparatus for controlling an anti-barking device, which determines whether vibration characteristics detected when a dog is barking include characteristics of head shaking and dog's laryngeal prominence vibration. However, for a barking pet dog in motion, this solution cannot accurately recognize the characteristics of head shaking and dog's laryngeal prominence vibration, which will in turn cause false triggering of the anti-barking device by the pet dog in motion.

SUMMARY

Accordingly, in view of the above problems, the present disclosure provides an apparatus and method for controlling an anti-barking device with noise reduction. The apparatus has the advantages of reasonable structure, low manufacturing cost, sensitive sound recognition and accurate recognition of barking of pets.

In order to solve the technical problems, the present disclosure adopts the following solution: an apparatus for controlling an anti-barking device with noise reduction includes a fixing device wearable on a neck of a pet dog, a housing, an anti-barking device, a main microphone sound collection module, an auxiliary microphone sound collection module, a differential amplifier module and a microprocessor. The housing is arranged on the fixing apparatus and located at a vocal position of a throat at the neck of the pet dog, and the anti-barking device is arranged on the housing. The apparatus further includes a sound sound-based detection start module and a motion sensor. The main microphone sound collection module is mounted in the housing, and a pickup hole of a main microphone of the main microphone sound collection module is located at a bottom of the housing close to the vocal position of the throat of the pet dog. The auxiliary microphone sound collection module is mounted in the housing, and a pickup hole of an auxiliary microphone of the auxiliary microphone sound collection module is located at a top of the housing away from the vocal position of the throat of the pet dog. The microphones of the main microphone sound collection module and the auxiliary microphone sound collection module have a same sensitivity and frequency response, and the microphones of the main microphone sound collection module and the auxiliary microphone sound collection module have a same pickup hole and internal space. The main microphone sound collection module and the auxiliary microphone sound collection module respectively collect and amplify barking sound, and send the amplified barking sound into the differential amplifier module for filtering out environmental noise. The differential amplifier module filters out environmental noise by using an inverted sound wave based on phase cancellation, and outputs a noiseless barking sound signal to the microprocessor. The microprocessor performs fast Fourier transform to calculate frequency-domain characteristics, and determines whether the frequency-domain characteristics conform to frequency characteristics of barking sound of pet dogs stored in the microprocessor. The sound-based detection start module is connected with an output of the main microphone sound collection module. An output of the sound-based detection start module is connected with an input of the microprocessor. The sound-based detection start module compares the signal collected by the main microphone sound collection module with a preset threshold, and awakens the microprocessor if the collected signal is greater than the preset threshold. The motion sensor is arranged on the fixing device, and the motion sensor is connected to the sound-based detection start module. An output of the motion sensor is connected with the input of the microprocessor. When collecting sound, the sound-based detection start module triggers the motion sensor to start detecting a motion increment of the pet dog and send the motion increment to the microprocessor. The microprocessor calculates differences between the two adjacent increments of X-axis, Y-axis and Z-axis sampled at a fixed cycle. The microprocessor calculates a root mean square (RMS) of the differences of X-axis, Y-axis and Z-axis, compares the RMS with a preset threshold and records the RMS. The collection of the motion sensor and the collection of the sound are stopped synchronously. The microprocessor calculates an average (AVG) of the recorded RMSs, and determines, if the AVG exceeds a preset increment, that the pet dog currently wearing the anti-barking device is barking. Upon determining that the pet dog is barking, the microprocessor controls the anti-barking device to stimulate the pet dog to stop barking.

Further, the apparatus further includes a wearing detection module. The wearing detection module is arranged in the housing, and the wearing detection module is connected with the anti-barking device. An output of the wearing detection module is connected with the input of the microprocessor. The wearing detection module detects whether static pulse electroshock posts of the anti-barking device are in contact with skin to cause a load to vary. The wearing detection module acquires a current static pulse current across the static pulse electroshock posts of the anti-barking device, compares the current static pulse current with a preset idle current threshold, and determines, if the current static pulse current is greater than the preset idle current threshold, that the pet dog has worn the anti-barking device successfully.

Further, the anti-barking device stimulates the pet dog to stop barking by means of static pulses, vibrations, warning sound or ultrasound.

Further, the apparatus further includes a human-machine interaction module. The human-machine interaction module is connected with the microprocessor and configured to perform training output mode selection and display a working state of the anti-barking device.

A method for controlling an anti-barking device with noise reduction includes using a fixing device wearable on a neck of a pet dog, a housing and an anti-barking device. The housing is arranged on the fixing apparatus and located at a vocal position of a throat at the neck of the pet dog, and the anti-barking device is arranged on the housing and configured to stop the pet dog from barking. The method further includes using a motion sensor and a sound-based detection start module. The method includes:

detecting sound of the pet dog: microphones of a main microphone sound collection module and an auxiliary microphone sound collection module are set to have a sensitivity and frequency response, and the microphones of the main microphone sound collection module and the auxiliary microphone sound collection module to have a same pickup hole and internal space, the main microphone sound collection module close to a vocal position of the throat of the pet dog collects sound, and the auxiliary microphone sound collection module mounted at a top of the housing away from the vocal position of the throat of the pet dog collects sound;

performing noise reduction on the collected sound: the main microphone sound collection module and the auxiliary microphone sound collection module respectively collect and amplify barking sound, and send the amplified barking sound into a differential amplifier module for filtering out environmental noise, and the differential amplifier module filters out environmental noise by using an inverted sound wave based on phase cancellation and outputs a noiseless barking sound signal to a microprocessor; and determining whether the signal conforms to a frequency of barking sound: the microprocessor performs fast Fourier transform on the noiseless barking sound signal to calculate frequency-domain characteristics and determines whether frequency-domain characteristics conform to frequency characteristics of barking sound of pet dogs stored in the microprocessor. The sound-based detection start module compares the signal collected by the main microphone sound collection module with a preset threshold, and awakens the microprocessor if the collected signal is greater than the preset threshold. When collecting sound, the sound-based detection start module triggers the motion sensor to start detecting a motion increment of the pet dog and send the motion increment to the microprocessor. The microprocessor calculates differences between the two adjacent increments of X-axis, Y-axis and Z-axis sampled at a fixed cycle. The microprocessor calculates a root mean square (RMS) of the differences of X-axis, Y-axis and Z-axis, compares the RMS with a preset threshold and records the RMS. The collection of the motion sensor and the collection of the sound are stopped synchronously. The microprocessor calculates an average (AVG) of the recorded RMSs, and determines, if the AVG exceeds a preset increment, that the pet dog currently wearing the anti-barking device is barking. Upon determining that the pet dog is barking, the microprocessor controls the anti-barking device to stimulate the pet dog to stop barking.

Further, the microprocessor is provided with an automatic sensitivity determination system, that is, the microprocessor determines whether the current barking sound is the barking sound of the pet dog by calculating an amplitude proportion of the barking sound with effective frequency in the whole sound. The microprocessor is provided with an artificial intelligence system, so that the microprocessor is capable of learning unrecognized barking sound to generate corresponding frequency characteristics and adding the frequency characteristics to a frequency range of barking sound.

Further, before the detection of the sound of the pet dog is started, a wearing detection module is used to detect whether the anti-barking device is worn on the neck of the pet dog.

By adopting the above technical solution, the present disclosure has the following beneficial effects: the main microphone sound collection module close to the vocal position of the throat of the pet dog collects sound, and the auxiliary microphone sound collection module mounted at the top of the housing away from the vocal position of the throat of the pet dog collects sound. The microphones of the main microphone sound collection module and the auxiliary microphone sound collection module have the same sensitivity and frequency response, and the microphones of the main microphone sound collection module and the auxiliary microphone sound collection module have the same pickup hole and internal space. The sound collected by the main microphone sound collection module and the auxiliary microphone sound collection module is sent to the differential amplifier module for filtering out environmental noise. The differential amplifier module filters out the environmental noise by using an inverted sound wave based on phase cancellation to obtain the noiseless barking sound signal. The microprocessor performs fast Fourier transform on the noiseless barking sound signal to calculate the frequency-domain characteristics, and determines whether the frequency-domain characteristics conform to the frequency characteristics of barking sound of pet dogs stored in the microprocessor. The sound-based detection start module is used to awaken the microprocessor in the sleep state such that the microprocessor starts detecting sound. The sound-based detection start module compares the signal collected by the main microphone sound collection module with a preset threshold, and awakens the microprocessor if the collected signal is greater than the preset threshold. Moreover, when collecting sound, the sound-based detection start module triggers the motion sensor to start detecting the motion increment of the pet dog and send the motion increment to the microprocessor. The microprocessor calculates differences between the two adjacent increments of X-axis, Y-axis and Z-axis sampled at a fixed cycle. The microprocessor calculates the RMS of the differences of X-axis, Y-axis and Z-axis, compares the RMS with the preset threshold and records the RMS. The collection of the motion sensor and the collection of the sound are stopped synchronously. The microprocessor calculates the AVG of the recorded RMSs, and determines, if the AVG exceeds a preset increment, that the pet dog currently wearing the anti-barking device is barking. In a case that there are multiple pet dogs, when other pet dogs also bark, the main microphone sound collection module and the auxiliary microphone sound collection module on the anti-barking device will also collect signals of barking sound of other pet dogs, but the sound signals collected by the two collection modules have different strengths. The signals are processed by the differential amplifier module so that the signal strength reaches the trigger standard. Furthermore, the motion sensor may be used to determine whether the barking sound is from other pet dogs by incremental analysis, thereby further reducing false operation. The incremental analysis can capture the vibration component of the whole pet dog in real time, thereby realizing more accurate recognition and minimizing the error rate of determining whether the pet dog itself is barking. Upon determining that the pet dog is barking, the microprocessor controls the anti-barking device to stimulate the pet dog to stop barking. This prevents false anti-barking operation caused by noise from other pet dogs. The microprocessor also has an automatic sensitivity determination program that determines whether the current barking sound is effective by calculating an amplitude proportion of the barking sound with effective frequency in the whole sound, which is different from other anti-barking devices that make determinations by presetting different sensitivities for different sizes of dogs. The microprocessor may also have an artificial intelligence system, so that the microprocessor can learn unrecognized barking sound by means of the artificial intelligence system to generate corresponding frequency characteristics and add the frequency characteristics to a frequency range of barking sound. The apparatus of the present disclosure is simple and convenient to use, and has the advantages of reasonable structure, low manufacturing cost, sensitive sound recognition and accurate recognition of barking of pets. Further, the distance between the main and auxiliary microphone sound collection modules is controlled at 15 to 35 mm, which ensures that surrounding noises the same distance from the pet dog have the same phase and gain when reaching the main and auxiliary microphone sound collection modules, thereby ensuring the noise reduction effect. When the wearing detection module detects that the pet dog is not wearing the anti-barking device, the anti-barking device will not work but enter a low power consumption state, which prevents the anti-barking device that is not worn on a pet dog from being influenced by outside interference. The human-machine interaction module is connected with the microprocessor and configured to perform training output mode selection and display a working state of the anti-barking device. As a result, the apparatus and method of the present invention can be widely popularized and applied.

DESCRIPTION OF EMBODIMENTS

The present disclosure will be further described in conjunction with the accompanying drawings and specific implementations.

Referring to FIG. 1 to FIG. 8, preferably, an apparatus for controlling an anti-barking device with noise reduction according to the present disclosure includes a fixing device wearable on a neck of a pet dog, a housing 1, an anti-barking device 2, a main microphone sound collection module 3, an auxiliary microphone sound collection module 4, a differential amplifier module 5, a microprocessor 6, a human-machine interaction module 7, a sound-based detection start module 8, a motion sensor 9 and a wearing detection module 10. The housing 1 is arranged on the fixing apparatus and located at a vocal position of a throat at the neck of the pet dog, and the anti-barking device 2 is arranged on the housing 1. The anti-barking device 2 is a static pulse generator. The main microphone sound collection module 3 is mounted in the housing 1, and a pickup hole 31 of a main microphone of the main microphone sound collection module is located at a bottom of the housing 1 close to the vocal position of the throat of the pet dog. The auxiliary microphone sound collection module 4 is mounted in the housing 1, and a pickup hole 41 of an auxiliary microphone of the auxiliary microphone sound collection module is located at a top of the housing 1 away from the vocal position of the throat of the pet dog. The microphones of the main microphone sound collection module 3 and the auxiliary microphone sound collection module 4 have a same sensitivity and frequency response, and the microphones of the main microphone sound collection module 3 and the auxiliary microphone sound collection module 4 have a same pickup hole and internal space. The main microphone sound collection module 3 and the auxiliary microphone sound collection module 4 respectively collect and amplify barking sound, and send the amplified barking sound into the differential amplifier module 5 for filtering out environmental noise. The differential amplifier module 5 filters out environmental noise by using an inverted sound wave based on phase cancellation, and outputs a noiseless barking sound signal to the microprocessor 6. The microprocessor 6 performs fast Fourier transform to calculate frequency-domain characteristics, and determines whether the frequency-domain characteristics conform to frequency characteristics of barking sound of pet dogs stored in the microprocessor 6. Upon determining that the pet dog is barking, the microprocessor 6 controls the anti-barking device 2 to stimulate the pet dog to stop barking. Usually, the microprocessor 6 is in a sleep state, which can reduce power consumption. The sound-based detection start module 8 is connected with an output of the main microphone sound collection module 3. An output of the sound-based detection start module 8 is connected with an input of the microprocessor 6. The sound-based detection start module 8 compares the signal collected by the main microphone sound collection module 3 with a preset threshold of the sound-based detection start module 8, and awakens the microprocessor 6 if the collected signal is greater than the preset threshold. The motion sensor 9 is arranged on the fixing device, and the motion sensor 9 is connected to the sound-based detection start module 8. An output of the motion sensor 9 is connected with the input of the microprocessor 6. When collecting sound, the sound-based detection start module 8 triggers the motion sensor 9 to start detecting a motion increment of the pet dog and send the motion increment to the microprocessor 6. The microprocessor 6 calculates differences between the two adjacent increments of X-axis, Y-axis and Z-axis sampled at a fixed cycle. The microprocessor 6 calculates a root mean square (RMS) of the differences of X-axis, Y-axis and Z-axis, compares the RMS with a preset threshold and records the RMS. The collection of the motion sensor 9 and the collection of the sound are stopped synchronously. The microprocessor 6 calculates an average (AVG) of the recorded RMSs, and determines, if the AVG exceeds a preset increment, that the pet dog currently wearing the anti-barking device is barking. Then, the microprocessor 6 controls the anti-barking device 2 to stimulate the pet dog to stop barking.

Figure 1:
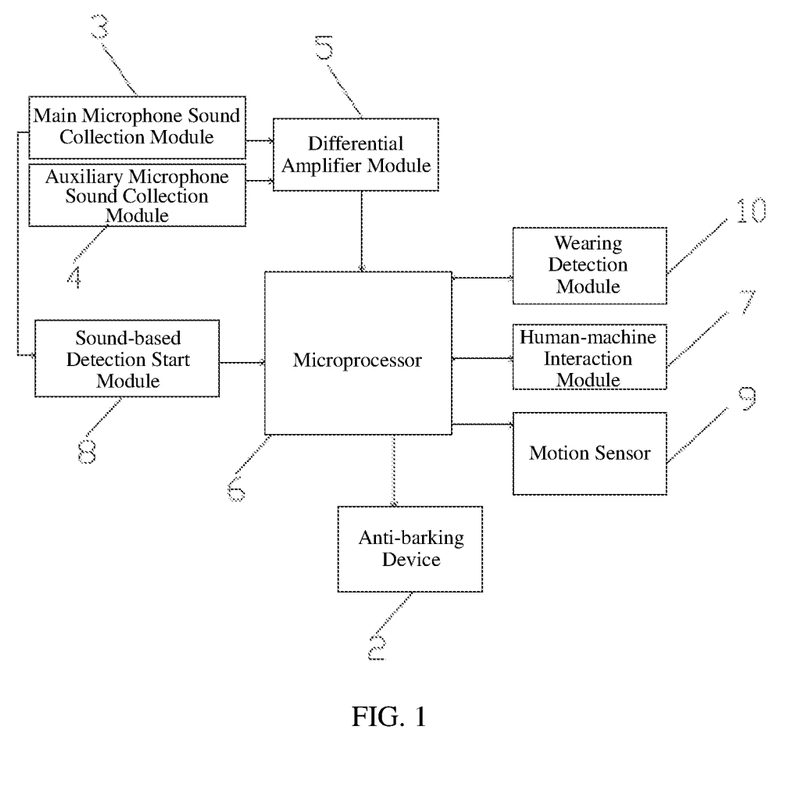
FIG. 1 is a functional block diagram of an apparatus for controlling an anti-barking device according to an embodiment of the present disclosure.

The formula for calculating the RMS of the differences of X, Y and Z is:

$$RMS = \sqrt{\Delta X^2 + \Delta Y^2 + \Delta Z^2}.$$

The formula for calculating the AVG of all the RMSs is:

$$AVG = (RMS_1 + RMS_2 + \ldots + RMS_n)/n.$$

The wearing detection module 10 is arranged in the housing 1, and the wearing detection module is connected with the anti-barking device. An output of the wearing detection module 10 is connected with the input of the microprocessor 6. The wearing detection module 10 detects whether static pulse electroshock posts of the anti-barking device 2 are in contact with skin to cause a load to vary. The wearing detection module 10 acquires a current static pulse current across the static pulse electroshock posts of the anti-barking device 2, compares the current static pulse current with a preset idle current threshold, and determines, if the current static pulse current is greater than the preset idle current threshold, that the pet dog has worn the anti-barking device successfully. The human-machine interaction module 7 is connected with the microprocessor 6 and configured to perform training output mode selection and display a working state of the anti-barking device 2.

The frequency of barking sound of pet dogs varies greatly according to different emotions. When a pet dog is on alert, it will growl, and the frequency of barking sound is about 120 Hz to 600 Hz. When a pet dog is hungry, the frequency of barking sound is about 1330 Hz to 1440 Hz. When the owner wants to abandon it, its barking sounds desolate and sonorous, with a frequency of about 1650 Hz to 2000 Hz. Dogs will also compete for favor of their owner, and at this time, the frequency of the barking sound is about 627 Hz.

Figure 5:
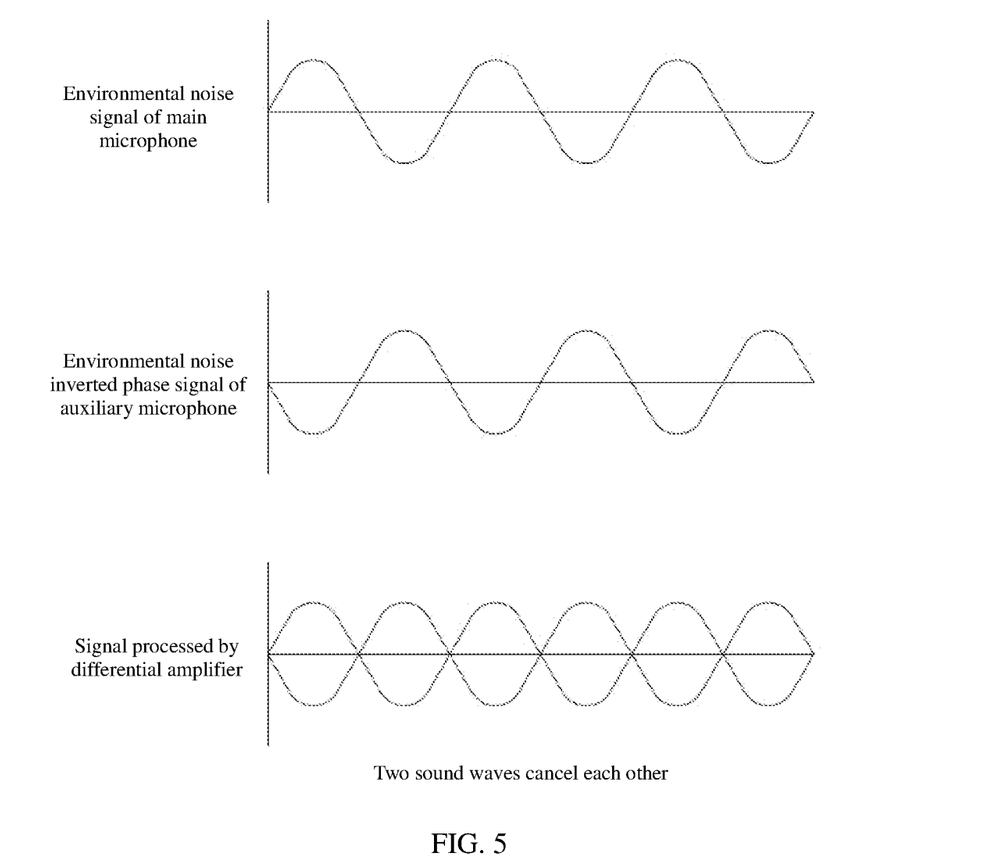
FIG. 5 is a typical schematic diagram showing noise reduction of a barking signal according to an embodiment of the present disclosure.
Figure 6:
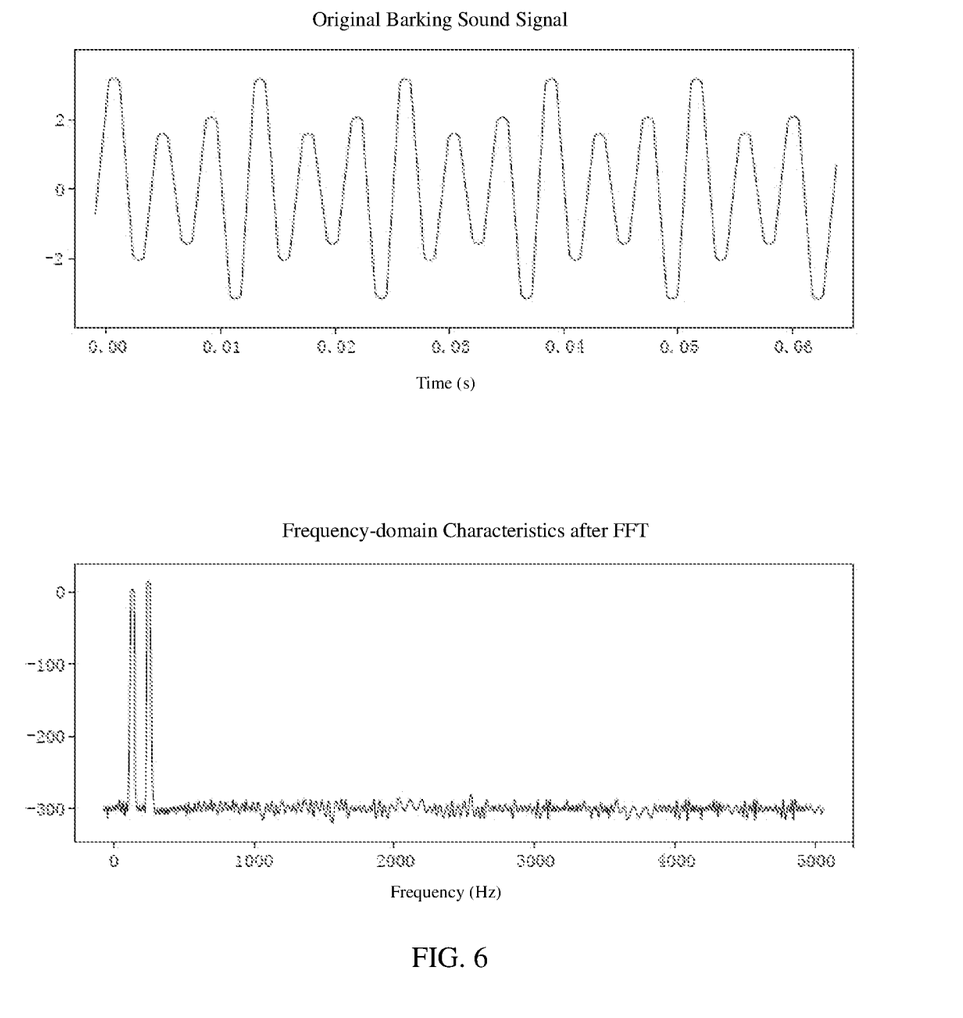
FIG. 6 shows typical schematic diagrams showing a barking signal before and after FFT according to an embodiment of the present disclosure.
Figure 7:
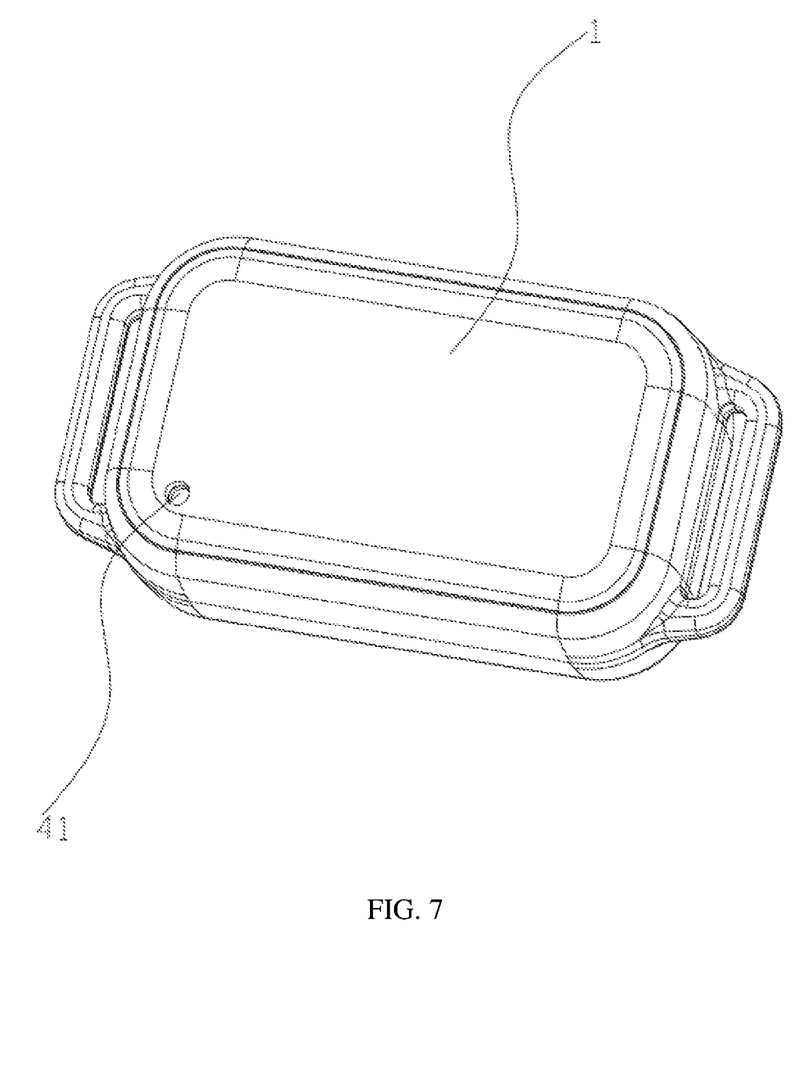
FIG. 7 is a front view of a housing of an anti-barking device according to an embodiment of the present disclosure.
Figure 8:
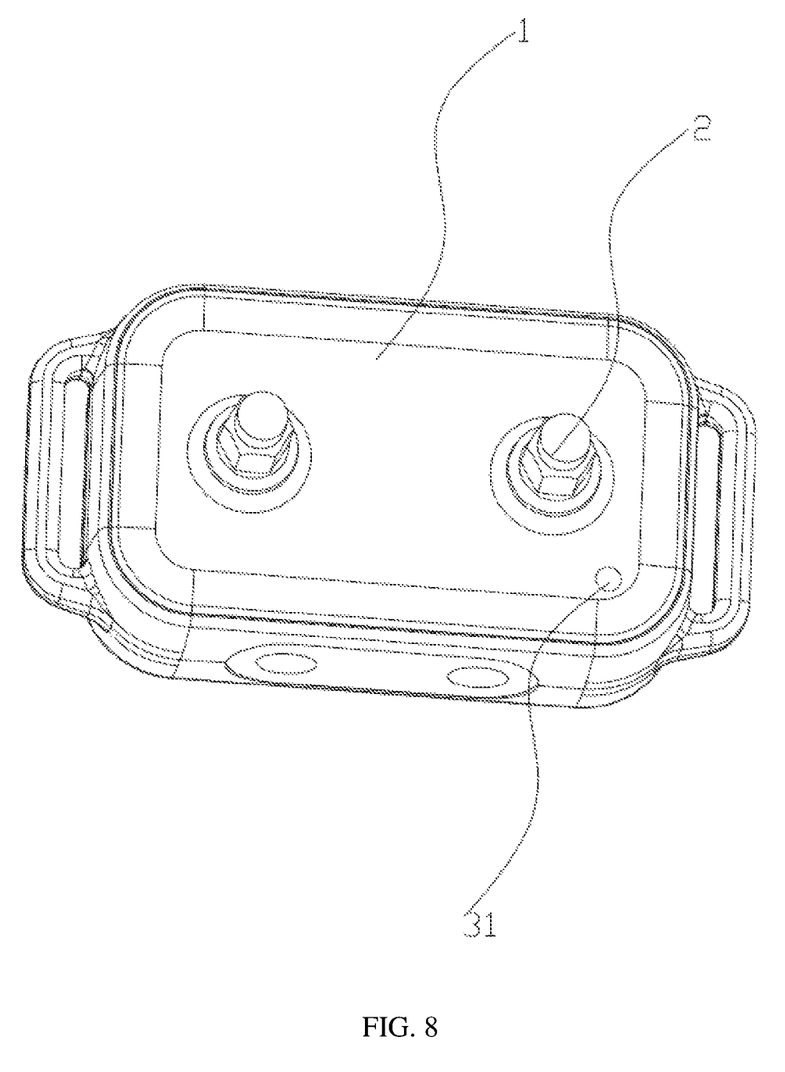
FIG. 8 is a rear view of the housing of the anti-barking device according to an embodiment of the present disclosure.

Referring to FIG. 5 and FIG. 6, the main microphone sound collection module 3 collects a signal Vm of a mixture of barking sound and noise, and the auxiliary microphone sound collection module 4 collects a signal Vs of a mixture of barking sound and noise. Since the main microphone of the main microphone sound collection module 3 is close to the vocal position of the throat, the collected barking sound signal is louder than the barking sound collected by the auxiliary microphone of the auxiliary microphone sound collection module 4. However, the noises collected by the microphones of the main microphone sound collection module 3 and the auxiliary microphone sound collection module 4 are the same. The signals collected by the main microphone sound collection module 3 and the auxiliary microphone sound collection module 4 are respectively inputted into the differential amplifier module 5 with a preset amplification factor of 1:1, and the differential amplifier filters out environmental noise by using inverted sound wave based on phase cancellation and outputs a signal Vo≈Ym−Vs. The Vo signal is a noiseless signal, which is the real barking sound. The noiseless barking sound signal is sent to the microprocessor. The microprocessor samples the sound signals with a sampling frequency of Fs=10K and a sampling number of 4096. After the sampling is stopped, the noiseless barking sound signal is subjected to fast Fourier transform (FFT) to obtain frequency-domain characteristics, including a frequency and an amplitude of the original signal. The obtained frequency is within the range of f=Fs/2=5K, and the frequency of the barking sound of the pet dog is also within this detection range. In this way, it can be accurately determined whether the pet dog itself is barking.

Figure 3:
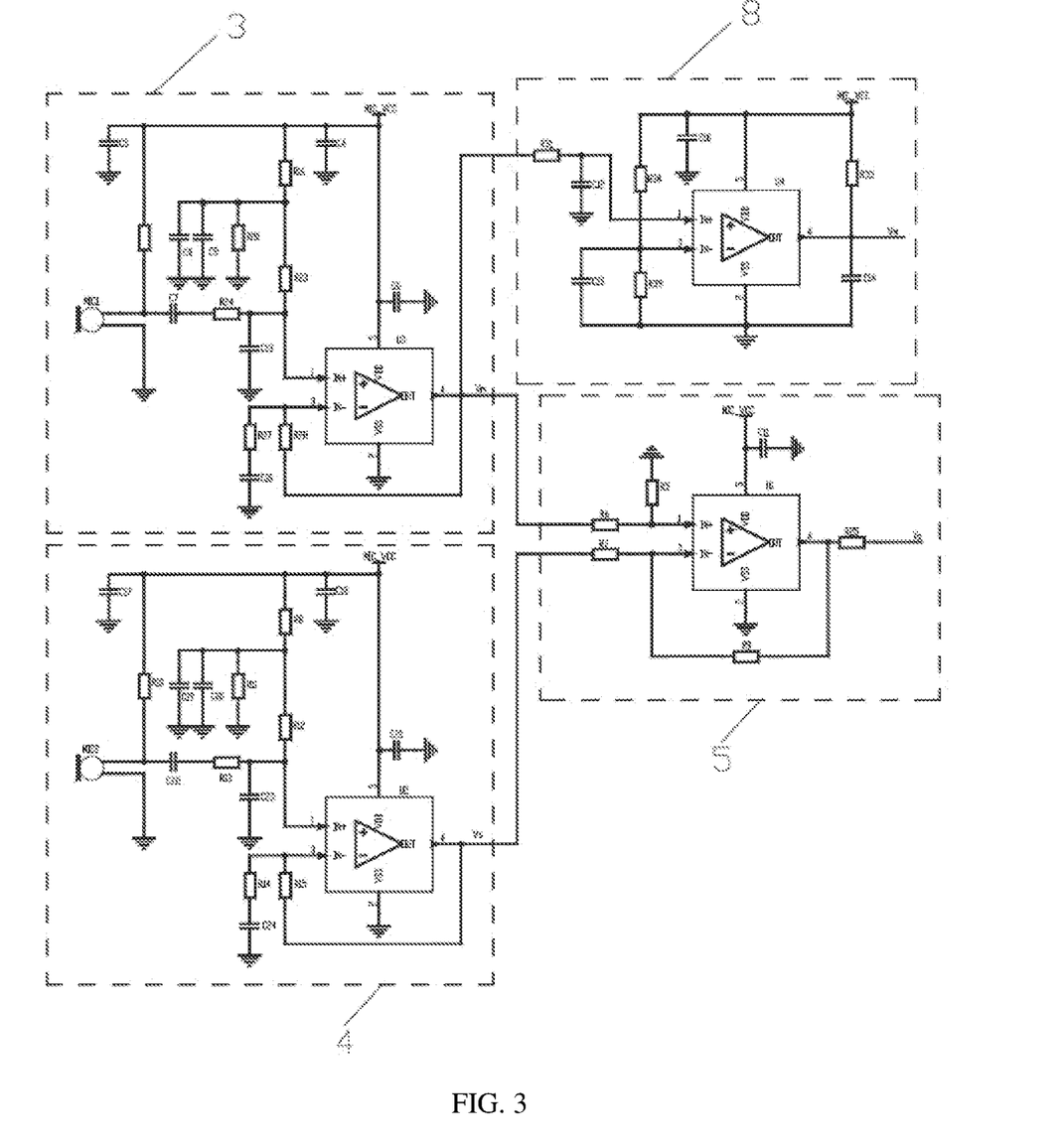
FIG. 3 is a schematic circuit diagram of a main microphone sound collection module, an auxiliary microphone sound collection module, a sound-based detection start module and a differential amplifier module according to an embodiment of the present disclosure.

Referring to FIG. 3, the operating principle of the main microphone sound collection module 3 is as follows: a resistor R21 provides a bias voltage to the main microphone. A resistor R16 and a resistor R20 for a voltage divider circuit that provides an audio signal reference voltage. A resistor R24 and a capacitor C13 forms a low-pass filter for filtering out high-frequency noise. A capacitor C7 is a DC-blocking capacitor that couples the audio signal converted by the microphone to a noninverting input of an operational amplifier U3, and an output voltage Vm is fed back to an inverting input of the operational amplifier U3 through resistors R27 and R28, thereby forming a voltage series negative feedback amplifier circuit, which operates based on the principles of a virtual short circuit and a virtual open circuit to obtain the amplification factor A=1+R28/R27.

Referring to FIG. 3, the operating principle of the auxiliary microphone sound collection module 4 is as follows: a resistor R10 provides a bias voltage to the auxiliary microphone. A resistor R8 and a resistor R11 form a voltage divider circuit that provides an audio signal reference voltage. A resistor R13 and a capacitor C23 forms a low-pass filter for filtering out high-frequency noise. A capacitor C22 is a DC-blocking capacitor that couples the audio signal converted by the microphone to a noninverting input of an operational amplifier U2, and an output voltage Vs is fed back to an inverting input of the operational amplifier U2 through resistors R14 and R15, thereby forming a voltage series negative feedback amplifier circuit, which operates based on the principles of a virtual short circuit and a virtual open circuit to obtain the amplification factor A=1+R15/R14.

Referring to FIG. 3, the operating principle of the sound-based detection start module 8 is as follows: a resistor R31 and a capacitor C12 form a low-pass filter for filtering out high-frequency noise. The sound signal Vs of the main microphone is inputted to a +input of a comparator U4 through the low-pass filter. Resistors R34 and R39 form a voltage divider circuit that provides a reference voltage for the comparator U4. When the Vs audio signal is greater than the reference voltage, an output Vw of the comparator U4 outputs a high level to the microprocessor to awaken the microprocessor.

Referring to FIG. 3, the operating principle of the differential amplifier module 5 is as follows: Resistors R5, R6, R7 and R9 and an operational amplifier U1 form a differential amplifier circuit. When R5=R6=R7=R9, the output Vo=Vm−Vs.

Figure 4:
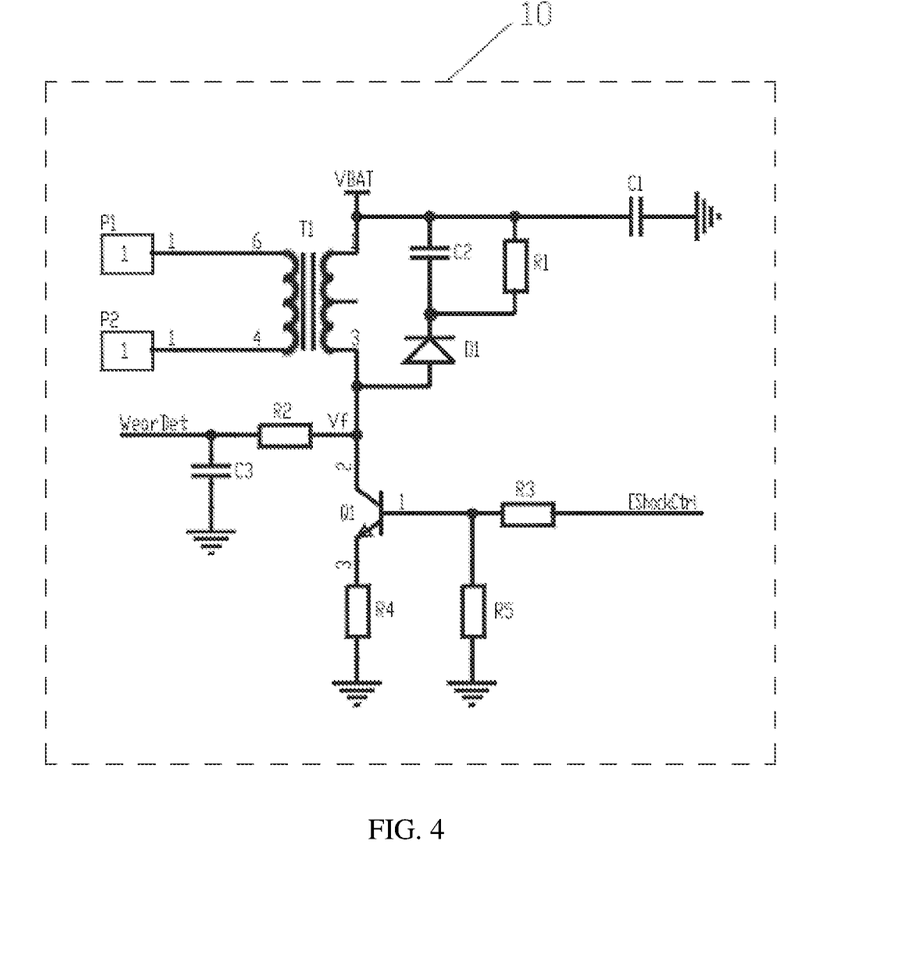
FIG. 4 is a schematic circuit diagram of a wearing detection module according to an embodiment of the present disclosure.

Referring to FIG. 4, the operating principle of the wearing detection module 10 is as follows: a port EShockCtrl of the microprocessor outputs a fast high-level pulse, which is divided by resistors R3 and R5 to drive a transistor Q1 to be on. A booster transformer T1 boosts VBAT to a specified voltage. A resistor R4 is a current sampling resistor which provides a reference voltage for Point Vf. A resistor R2 is an isolation resistor. A capacitor C3 is a filter capacitor. When outputs of static pulse electroshock posts P1 and P2 come into contact with skin, a load varies, causing a variation of voltage at Point Vf. Based on this variation, it is determined whether the pet dog is wearing the anti-barking device.

Figure 2:
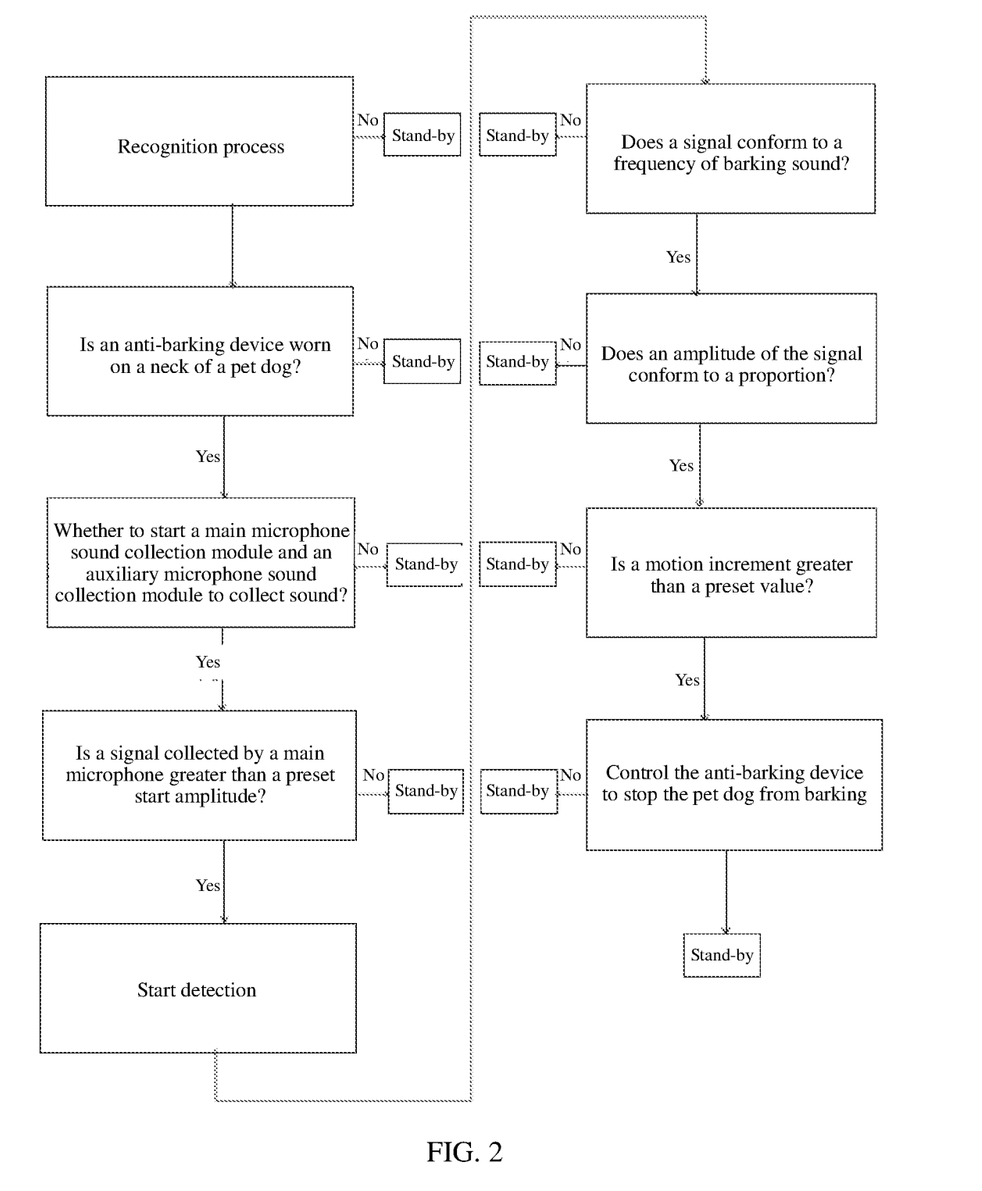
FIG. 2 is a flowchart of a method for controlling an anti-barking device according to an embodiment of the present disclosure.

Referring to FIG. 2, preferably, a method for controlling an anti-barking device with noise reduction includes using a fixing device wearable on a neck of a pet dog, a housing and an anti-barking device. The housing is arranged on the fixing apparatus and located at a vocal position of a throat at the neck of the pet dog, and the anti-barking device is arranged on the housing and configured to stop the pet dog from barking. The method includes:

A wearing detection module is used to detect whether the anti-barking device is worn on the neck of the pet dog.

Sound of the pet dog is detected: Microphones of a main microphone sound collection module and an auxiliary microphone sound collection module are set to have a sensitivity and frequency response, and the microphones of the main microphone sound collection module and the auxiliary microphone sound collection module to have a same pickup hole and internal space. The main microphone sound collection module close to a vocal position of the throat of the pet dog collects sound, and the auxiliary microphone sound collection module mounted at a top of the housing away from the vocal position of the throat of the pet dog collects sound. A sound-based detection start module compares a signal collected by the main microphone sound collection module with a preset threshold, and awakens a microprocessor if the collected signal is greater than the preset threshold. When collecting sound, the sound-based detection start module triggers a motion sensor to start detecting a motion increment of the pet dog and send the motion increment to the microprocessor.

Noise reduction is performed on the collected sound: The main microphone sound collection module and the auxiliary microphone sound collection module respectively collect and amplify barking sound, and send the amplified barking sound into a differential amplifier module for filtering out environmental noise, and the differential amplifier module filters out environmental noise by using an inverted sound wave based on phase cancellation and outputs a noiseless barking sound signal to the microprocessor.

It is determined whether the signal conforms to a frequency of barking sound: The microprocessor performs fast Fourier transform on the noiseless barking sound signal to calculate frequency-domain characteristics, and determines whether the frequency-domain characteristics conform to frequency characteristics of barking sound of pet dogs stored in the microprocessor. The microprocessor is provided with an automatic sensitivity determination system, that is, the microprocessor determines whether the current barking sound is the barking sound of the pet dog by calculating an amplitude proportion of the barking sound with effective frequency in the whole sound. The microprocessor calculates differences between the two adjacent increments of X-axis, Y-axis and Z-axis sampled at a fixed cycle. The microprocessor calculates an RMS of the differences of X-axis, Y-axis and Z-axis, compares the RMS with a preset threshold and records the RMS. The collection of the motion sensor and the collection of the sound are stopped synchronously. The microprocessor calculates an AVG of the recorded RMSs, and determines, if the AVG exceeds a preset increment, that the pet dog currently wearing the anti-barking device is barking. Upon determining that the pet dog is barking, the microprocessor controls the anti-barking device to stimulate the pet dog to stop barking. The microprocessor is provided with an artificial intelligence system, so that the microprocessor is capable of learning unrecognized barking sound to generate corresponding frequency characteristics and adding the frequency characteristics to a frequency range of barking sound.

The microprocessor in the present disclosure is a microcontroller unit (MCU), such as an STM32L4 Cortex-M4 ultra-low-power MCU or an STM32 U5 series Cortex-M33 ultra-low-power MCU. A distance between the main microphone sound collection module and the auxiliary microphone sound collection module is preferably 15 to 35 mm. The anti-barking device may also be an anti-barking mechanism that stimulates the pet dog to stop barking by means of vibrations, warning sound or ultrasound.

Although the present disclosure has been specifically shown and described in connection with the preferred implementations, it should be understood by those skilled in the art that various changes in form and details can be made without departing from the spirit and scope of the present disclosure as defined by the appended claims, and shall all fall within the protection scope of the present disclosure.

The invention claimed is:

1. An apparatus for controlling an anti-barking device with noise reduction, comprising a fixing device wearable on a neck of a pet dog, a housing, an anti-barking device, a main microphone sound collection module, an auxiliary microphone sound collection module, a differential amplifier module and a microprocessor, the housing being arranged on the fixing device and located at a vocal position of a throat at the neck of the pet dog, and the anti-barking device being arranged on the housing, wherein the apparatus further comprises a sound-based detection start module and a motion sensor; the main microphone sound collection module is mounted in the housing, and a pickup hole of a main microphone of the main microphone sound collection module is located at a bottom of the housing close to the vocal position of the throat of the pet dog; the auxiliary microphone sound collection module is mounted in the housing, and a pickup hole of an auxiliary microphone of the auxiliary microphone sound collection module is located at a top of the housing away from the vocal position of the throat of the pet dog; the main microphone of the main microphone sound collection module and the auxiliary microphone of the auxiliary microphone sound collection module have a same sensitivity and frequency response, and the main microphone of the main microphone sound collection module and the auxiliary microphone of the auxiliary microphone sound collection module have a same pickup hole and internal space; the main microphone sound collection module and the auxiliary microphone sound collection module respectively collect and amplify barking sound to yield an amplified barking sound, and send the amplified barking sound into the differential amplifier module for filtering out environmental noise; the differential amplifier module filters out the environmental noise by using an inverted sound wave based on phase cancellation, and outputs a noiseless barking sound signal to the microprocessor; the microprocessor performs fast Fourier transform to calculate frequency-domain characteristics, and determines whether the frequency-domain characteristics conform to frequency characteristics of barking sound of pet dogs stored in the microprocessor; the sound-based detection start module is connected with an output of the main microphone sound collection module, an output of the sound-based detection start module is connected with an input of the microprocessor, and the sound-based detection start module compares a signal collected by the main microphone sound collection module with a preset threshold, and awakens the microprocessor when the signal collected by the main microphone sound collection module is greater than the preset threshold; the motion sensor is arranged on the fixing device, and the motion sensor is connected to the sound-based detection start module; an output of the motion sensor is connected with the input of the microprocessor; when collecting sound, the sound-based detection start module triggers the motion sensor to start detecting a motion increment of the pet dog and send the motion increment to the microprocessor; the microprocessor calculates differences between two adjacent increments of X-axis, Y-axis and Z-axis sampled at a fixed cycle; the microprocessor calculates a root mean square (RMS) of the differences of X-axis, Y-axis and Z-axis, compares the RMS with a second preset threshold and records the RMS to yield recorded RMSs; collection of the motion sensor and collection of the sound are stopped synchronously; the microprocessor calculates an average (AVG) of the recorded RMSs, and determines, when the AVG exceeds a preset increment, that the pet dog currently wearing the anti-barking device is barking; and upon determining that the pet dog is barking, the microprocessor controls the anti-barking device to stimulate the pet dog to stop barking.

2. The apparatus for controlling an anti-barking device with noise reduction according to claim 1, further comprising a wearing detection module, wherein the wearing detection module is arranged in the housing, and the wearing detection module is connected with the anti-barking device; an output of the wearing detection module is connected with the input of the microprocessor; the wearing detection module detects whether static pulse electroshock posts of the anti-barking device are in contact with skin to cause a load to vary; and the wearing detection module acquires a current static pulse current across the static pulse electroshock posts of the anti-barking device, compares the current static pulse current with a preset idle current threshold, and determines, when the current static pulse current is greater than the preset idle current threshold, that the pet dog has worn the anti-barking device successfully.

3. The apparatus for controlling an anti-barking device with noise reduction according to claim 1, wherein the anti-barking device stimulates the pet dog to stop barking by means of static pulses, vibrations, warning sound or ultrasound.

4. The apparatus for controlling an anti-barking device with noise reduction according to claim 1, further comprising a human-machine interaction module, wherein the human-machine interaction module is connected with the microprocessor and configured to perform training output mode selection and display a working state of the anti-barking device.

5. A method for controlling an anti-barking device with noise reduction, comprising using a fixing device wearable on a neck of a pet dog, a housing and an anti-barking device, the housing being arranged on the fixing device and located at a vocal position of a throat at the neck of the pet dog, and the anti-barking device being arranged on the housing and configured to stop the pet dog from barking, wherein the method further comprising using a motion sensor and a sound-based detection start module; and the method comprises:

detecting sound of the pet dog: microphones of a main microphone sound collection module and an auxiliary microphone sound collection module are set to have a sensitivity and frequency response, and the microphones of the main microphone sound collection module and the auxiliary microphone sound collection module have a same pickup hole and internal space, the main microphone sound collection module close to a vocal position of the throat of the pet dog collects sound, and the auxiliary microphone sound collection module mounted at a top of the housing away from the vocal position of the throat of the pet dog collects sound;

performing noise reduction on the sound: the main microphone sound collection module and the auxiliary microphone sound collection module respectively collect and amplify barking sound to yield amplified barking sound, and send the amplified barking sound into a differential amplifier module for filtering out environmental noise, and the differential amplifier module filters out the environmental noise by using an inverted sound wave based on phase cancellation and outputs a noiseless barking sound signal to a microprocessor; and determining whether the noiseless barking sound signal conforms to a frequency of barking sound: the microprocessor performs fast Fourier transform on the noiseless barking sound signal to calculate frequency-domain characteristics and determines whether the frequency-domain characteristics conform to frequency characteristics of barking sound of pet dogs stored in the microprocessor; the sound-based detection start module compares a signal collected by the main microphone sound collection module with a preset threshold, and awakens the microprocessor when the signal is greater than the preset threshold; when collecting sound, the sound-based detection start module triggers the motion sensor to start detecting a motion increment of the pet dog and send the motion increment to the microprocessor; the microprocessor calculates differences between two adjacent increments of X-axis, Y-axis and Z-axis sampled at a fixed cycle; the microprocessor calculates a root mean square (RMS) of the differences of X-axis, Y-axis and Z-axis, compares the RMS with a second preset threshold and records the RMS to yield recorded RMSs; collection of the motion sensor and collection of the sound are stopped synchronously; the microprocessor calculates an average (AVG) of the recorded RMSs, and determines, when the AVG exceeds a preset increment, that the pet dog currently wearing the anti-barking device is barking; and upon determining that the pet dog is barking, the microprocessor controls the anti-barking device to stimulate the pet dog to stop barking.

6. The method for controlling an anti-barking device with noise reduction according to claim 5, wherein the microprocessor is provided with an automatic sensitivity determination system, in which, the microprocessor determines whether a current barking sound is the barking sound of the pet dog by calculating an amplitude proportion of the barking sound with effective frequency in the whole sound; and the microprocessor is provided with an artificial intelligence system, so that the microprocessor is configured to learn an unrecognized barking sound to generate corresponding frequency characteristics and add the frequency characteristics to a frequency range of barking sound.

7. The method for controlling an anti-barking device with noise reduction according to claim 5, wherein before the detection of the sound of the pet dog is started, a wearing detection module is used to detect whether the anti-barking device is worn on the neck of the pet dog.

* * * * *